(12) United States Patent
Hussain et al.

(10) Patent No.: US 11,239,509 B2
(45) Date of Patent: Feb. 1, 2022

(54) ACTIVELY CONTROLLED THERMAL CONDUCTIVITY FOR POWERTRAIN THERMAL MANAGEMENT

(71) Applicant: Ford Global Technologies, LLC, Dearborn, MI (US)

(72) Inventors: Quazi Ehtesham Hussain, Sylvania, OH (US); Mark John Jennings, Saline, MI (US); Chad Allan Baker, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 16/703,231

(22) Filed: Dec. 4, 2019

(65) Prior Publication Data

US 2021/0175560 A1    Jun. 10, 2021

(51) Int. Cl.
| | | |
|---|---|---|
| *H01M 4/02* | (2006.01) | |
| *H01M 10/653* | (2014.01) | |
| *H01M 10/613* | (2014.01) | |
| *H01M 10/625* | (2014.01) | |
| *H01M 10/63* | (2014.01) | |
| *B60L 58/26* | (2019.01) | |
| *B60K 6/28* | (2007.10) | |

(52) U.S. Cl.
CPC ............. *H01M 10/653* (2015.04); *B60K 6/28* (2013.01); *B60L 58/26* (2019.02); *H01M 10/613* (2015.04); *H01M 10/625* (2015.04); *H01M 10/63* (2015.04); *B60L 2240/545* (2013.01); *B60Y 2200/92* (2013.01); *B60Y 2306/05* (2013.01); *H01M 2220/20* (2013.01)

(58) Field of Classification Search
CPC ..................................................... H01M 4/02
See application file for complete search history.

(56) References Cited

U.S. PATENT DOCUMENTS

| | | |
|---|---|---|
| 4,515,206 A | 5/1985 | Carr |
| 7,735,327 B2 | 6/2010 | Brower et al. |
| 7,797,950 B2 | 9/2010 | Brower et al. |
| 7,827,743 B2 | 11/2010 | Campisi et al. |
| 9,255,347 B2 | 2/2016 | Ihlefeld et al. |
| 9,603,288 B2 | 3/2017 | Kwak et al. |
| 9,699,883 B2 | 7/2017 | Dede et al. |
| 2016/0102235 A1 | 4/2016 | Ihlefeld et al. |
| 2018/0145316 A1* | 5/2018 | Moon ..................... H01G 11/42 |

* cited by examiner

*Primary Examiner* — Jacob B Marks
(74) *Attorney, Agent, or Firm* — David Kelley; Carlson, Gaskey & Olds, P.C.

(57) ABSTRACT

A vehicle powertrain component includes a thermal transfer surface that transfers thermal energy out of a powertrain component and a thermally active material disposed over the thermal transfer surface. The thermally active material includes a variable thermal conductivity and an actuator coupled to the thermally active material induces changes in the thermal conductivity of the thermally active material. A controller governs operation of the actuator to adjust the thermal conductivity of the thermally active material responsive to a vehicle operating condition to maintain the powertrain component within a predefined temperature range.

25 Claims, 7 Drawing Sheets

ACTIVELY CONTROLLED THERMAL CONDUCTIVITY FOR POWERTRAIN THERMAL MANAGEMENT

TECHNICAL FIELD

This disclosure relates a system for controlling thermal conductivity of a powertrain component.

BACKGROUND

Thermal conductivity is the measure of heat flow through a solid, liquid or gas. Higher thermal conductivities correspond with less resistance to heat flow and lower thermal conductivities correspond with increased resistance to heat flow. Vehicle powertrain components are operated within predefined temperature ranges. Different vehicle operating conditions may benefit from different thermal conductivities.

SUMMARY

A vehicle powertrain component according to an exemplary aspect of the present disclosure includes, among other things, a thermal transfer surface that transfers thermal energy out of a powertrain component, a thermally active material disposed over the thermal transfer surface where the thermally active material includes a variable thermal conductivity, an actuator coupled to the thermally active material for inducing changes in the thermal conductivity of the thermally active material and a controller governing operation of the actuator to adjust the thermal conductivity of the thermally active material responsive to a vehicle operating condition to maintain the powertrain component within a predefined temperature range.

In a further embodiment of the foregoing vehicle powertrain component, the vehicle operating condition comprises a temperature detected by a temperature sensor mounted to the powertrain component.

In a further embodiment of the foregoing vehicle powertrain component, the vehicle operation condition comprises a duration of vehicle operation.

In a further embodiment of the foregoing vehicle powertrain component, the actuator comprises an electric power source electrically coupled to the thermally active material for inducing a charge that alters the thermal conductivity of the thermally active material.

In a further embodiment of the foregoing vehicle powertrain component, the actuator comprises a mechanical actuator coupled to the thermally active material for inducing a load on the thermal active material to alter the thermal conductivity of the thermally active material.

In a further embodiment of the foregoing vehicle powertrain component, the powertrain component comprises a battery pack.

In a further embodiment of the foregoing vehicle powertrain component, the controller is configured to receive information indicative of an ambient environment surrounding the battery pack and operate the actuator to adjust a thermal conductivity of the thermally active material to provide a predefined rate of thermal transfer from the battery pack.

In a further embodiment of the foregoing vehicle powertrain component, the thermally active material includes a first thermal conductivity at a first vehicle operating condition and a second thermal conductivity at a second vehicle operating condition.

In a further embodiment of the foregoing vehicle powertrain component, the thermally active material varies between a plurality of thermal conductivities between a first thermal conductivity and a second thermal conductivity.

In a further embodiment of the foregoing vehicle powertrain component, the first thermal conductivity is higher than the second thermal conductivity.

In a further embodiment of the foregoing vehicle powertrain component, the thermally active material is at the first thermal conductivity at an activated state and at second thermal conductivity as a default condition in the absence of an input from the actuator.

A vehicle battery pack assembly according to another exemplary aspect of the present disclosure includes, among other things, a battery pack including a thermal transfer surface through which thermal energy is directed out of the battery pack, a thermally active material disposed over the thermal transfer surface where the thermally active material includes a thermal conductivity that varies through a plurality of thermal conductivities between a first thermal conductivity and a second thermal conductivity, an actuator coupled to the thermally active material for inducing changes in the thermal conductivity and a controller governing operation of the actuator to adjust the thermal conductivity of the thermally active material responsive to a vehicle operating condition to provide a predefined rate of thermal transfer from the battery pack.

In a further non-limiting embodiment of the foregoing vehicle battery pack assembly, a temperature sensor generates a signal indicative of a temperature of the battery pack and the controller operates the actuator to vary the thermal conductivity of the thermally active material.

In a further non-limiting embodiment of the foregoing vehicle battery pack assembly, the vehicle operating condition comprises a duration of vehicle operation.

In a further non-limiting embodiment of the foregoing vehicle battery pack assembly, the actuator comprises an electric power source electrically coupled to the thermally active material for inducing a charge that alters the thermal conductivity of the thermally active material.

In a further non-limiting embodiment of the foregoing vehicle battery pack assembly, the actuator comprises a mechanical actuator coupled to the thermally active material for inducing a load on the thermal active material to alter the thermal conductivity of the thermally active material.

In a further non-limiting embodiment of the foregoing vehicle battery pack assembly, the first thermal conductivity is higher than the second thermal conductivity.

In a further non-limiting embodiment of the foregoing vehicle battery pack assembly, the thermally active material is at the first thermal conductivity as a default condition in the absence of an input from the actuator.

A method of controlling a temperature of a battery pack according to another exemplary aspect of the present disclosure includes, among other things, providing a thermally active material over a thermal transfer surface of a battery pack, measuring an operating parameter of the battery pack with a sensor, and operating an actuator coupled to the thermally active material to induce a change in thermal conductivity in the thermally active material responsive to the measured operating parameter.

A further non-limiting embodiment of any of the foregoing method, includes operating an actuator coupled to the thermally active material to induce a change in thermal conductivity in the thermally active material responsive to the measured operating parameter.

In a further non-limiting embodiment of any of the foregoing methods, the thermal conductivity of the thermally active material varies through a plurality of thermal conductivity values between a first thermal conductivity and a second thermal conductivity.

In a further non-limiting embodiment of any of the foregoing methods, the first thermal conductivity is higher than the second thermal conductivity.

In a further non-limiting embodiment of any of the foregoing methods, the first thermal conductivity is a default thermal conductivity for the thermally active material in the absence of an input from the actuator.

In a further non-limiting embodiment of any of the foregoing methods, the actuator comprises a variable electric power source and the thermal conductivity of the thermally active material varies in response to an induced electrical current.

In a further non-limiting embodiment of any of the foregoing methods, the actuator comprises a linear electric motor and the thermal conductivity of the thermally active material varies in response to a load induced by the linear electric motor.

The various features and advantages of this disclosure will become apparent to those skilled in the art from the following detailed description. The drawings that accompany the detailed description can be briefly described as follows.

DETAILED DESCRIPTION

Figure 1:
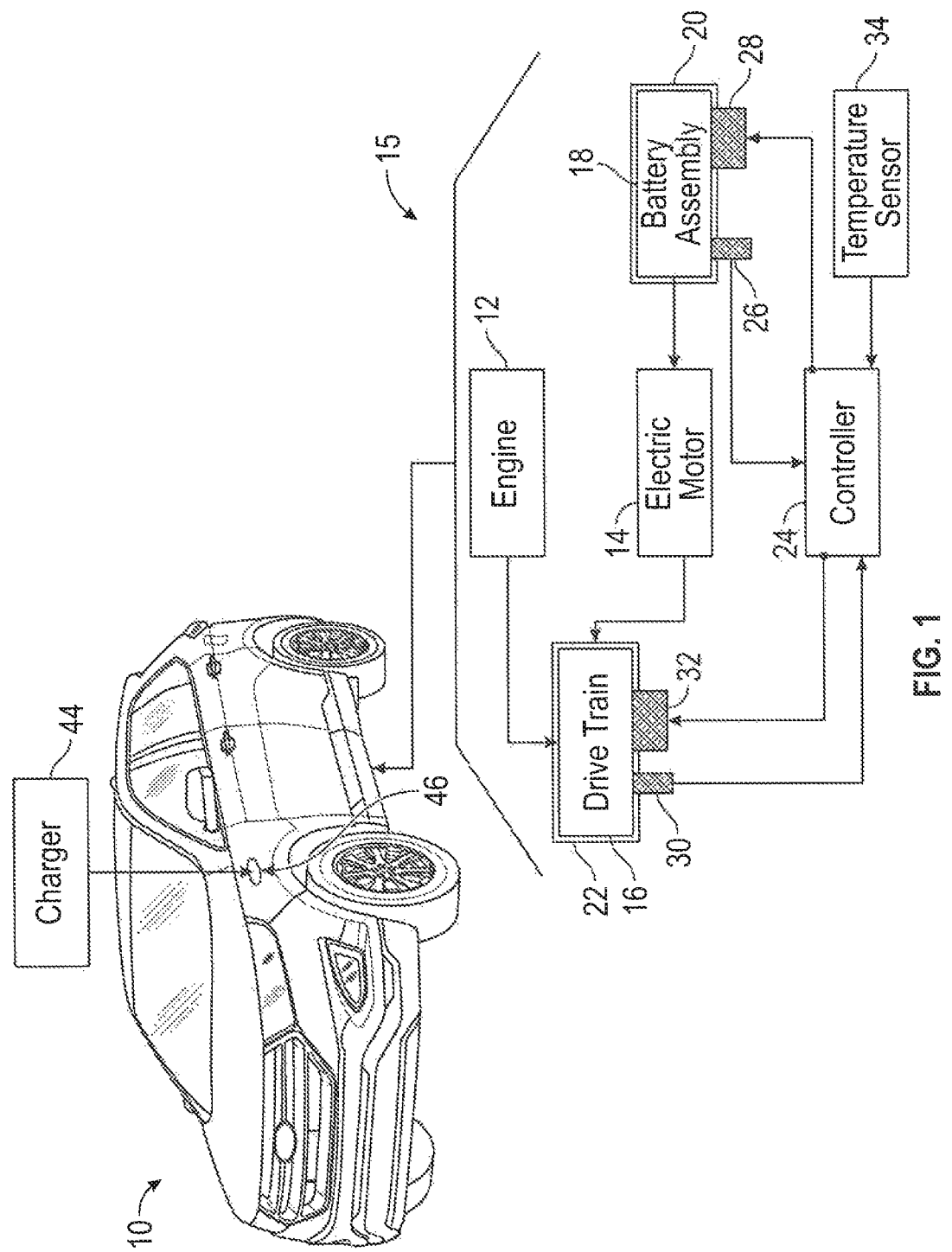
FIG. 1 is a schematic view of an example vehicle and powertrain assembly.

Referring to FIG. 1 a vehicle 10 includes a powertrain assembly that is shown schematically at 15. The example powertrain assembly 15 includes an engine 12 and electric motor 14 that are coupled to a drivetrain 16. The electric motor 14 is powered by a battery assembly 18. The vehicle 10 includes an electric port 46 for coupling to a charger 44 to charge the battery assembly 18. A controller 24 is provided to control operation of the powertrain assembly 15. The powertrain assembly 15 includes thermally active material disposed over thermal transfer surfaces for controlling the dissipation of heat. In this disclosed example, at least a portion of the battery assembly 20 and the drivetrain 16 are provided with thermally active materials 20, 22.

The example thermally active materials 20, 22 are actuatable to vary and adjust a thermal conductivity for controlling a rate of heat transfer. Thermal conductivity is a measure of resistance to heat flow through a medium. A high thermal conductivity corresponds with a low resistance to heat flow. A low thermal conductivity corresponds with a high resistance to heat flow. Thermal conductivity of common materials may change due to temperature changes but are not actively controllable to modify the rate of heat flow.

Figure 2:
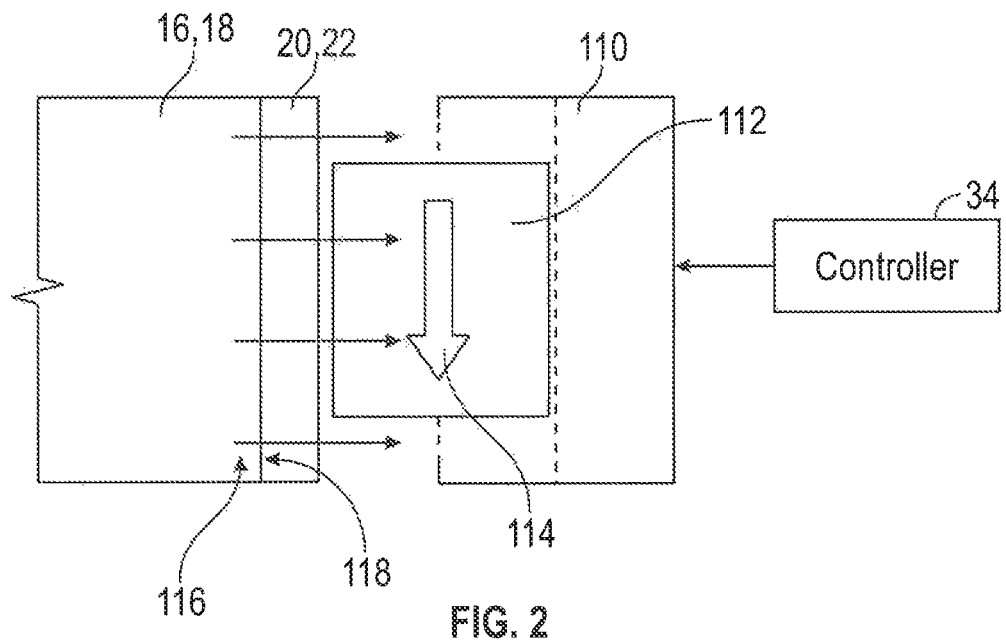
FIG. 2 is a schematic view of an example load activated thermally active material and actuator embodiment.

Referring to FIG. 2, in one disclosed example, the thermally active materials 20, 22 are coated over a thermal transfer surface 108. Heat schematically shown at 116 is transferred through the surface 118 and the thermally active materials 20, 22. The example thermally active materials 20, 22 in this example are actuated by the application of a load 114 imparted by linear portion 112 of an actuator 110. In this example, the actuator 110 may be a linear electric motor mounted proximate to the thermally active materials 20, 22 for applying a strain load to effect a change in thermal conductivity. In this disclosed example, the strain load is applied in a direction tangential to the thermally active material 20, 22. It should be appreciated that the direction in which the strain load is applied may be modified to accommodate application specific requirements and are within the scope and contemplation of this disclosure. The thermal conductivity is adjusted proportional to a magnitude of load applied by the actuator 28, 32.

Figure 3:
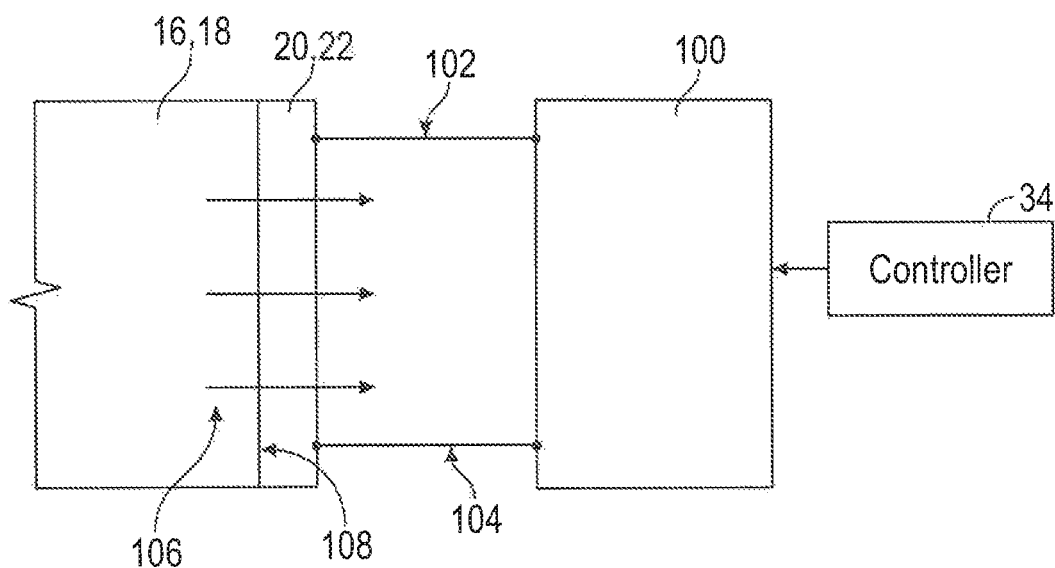
FIG. 3 is a schematic view of an example electrically activated thermally active material and actuator embodiment.

Referring to FIG. 3, in another disclosed example, the thermally active materials 20, 22 are actuated by the application of an electric current provided by a variable electric power source 100. The variable electric power source 100 is electrically coupled to the thermally active materials 20, 22 through conductors 102, 104. Heat transfer through a thermal transfer surface 118 coated with the thermally active materials 20, 22 is controlled by the application of a voltage charge to the thermally active materials 20, 22.

Figure 4:
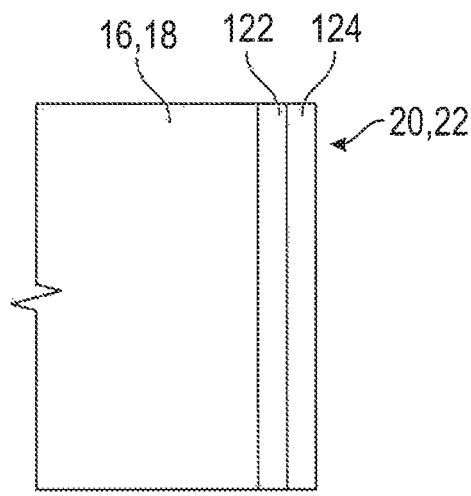
FIG. 4 is a schematic view of an example temperature activated thermally active material embodiment.

Referring to FIG. 4, in another disclosed example, the thermally active materials 20, 22 include a first material 122 and a second material 124 that use temperature as an activation mechanism to cause a phase change that results in a variation in thermal conductivity. The first material 122 is a solid that is suspended within the second material that is a liquid. The selection and combination of the solid first material 122 that is suspended within the liquid second material 124 provide for a change in phase at a defined temperature to provide the desired changes in thermal conductivity. In one disclosed example, a suspension of graphite in hexadecane is utilized, however, other combinations of the solid first material 122 and the liquid second material 124 are within the scope and contemplation of this disclosure.

Thermally active materials include ferroic twinned films that decrease thermal conductivity in response to the application of a load as described and shown schematically in FIG. 2 and return to the original thermal conductivity when the load is removed. The thermally active materials may also include a lead zirconate titanate that is actuatable by the application of an electric voltage as is schematically shown in FIG. 3. The application of the electric voltage decreases thermal conductivity in proportion to applied voltage. As appreciated, other thermally active materials beyond those described above are within the scope and contemplation of this disclosure.

Referring to FIG. 1, the disclosed powertrain assembly 15 includes components with heat transfer surfaces that are coated or otherwise covered by the thermally active material 20, 22. The thermally active material 20, 22 cover the thermal transfer surfaces to control heat transfer through that surface. An entire component, or only a portion of a component may be covered to control the flow of heat through all surfaces or only one surface of a component.

The disclosed assembly utilizes thermally active materials with a high thermal conductivity in a non-actuated, or default condition. Accordingly, in the default condition, heat transfer is maximized to enable efficient heat dissipation and cooling. When heat retention would provide a benefit, such as during initial warm up of a drivetrain component, the thermally active materials 20, 22 are actuated to reduce thermal conductivity and retain heat. Upon reaching a predefined temperature, the thermally active materials 20, 22 are deactivated and returned to the default thermal conductivity.

Figure 5:
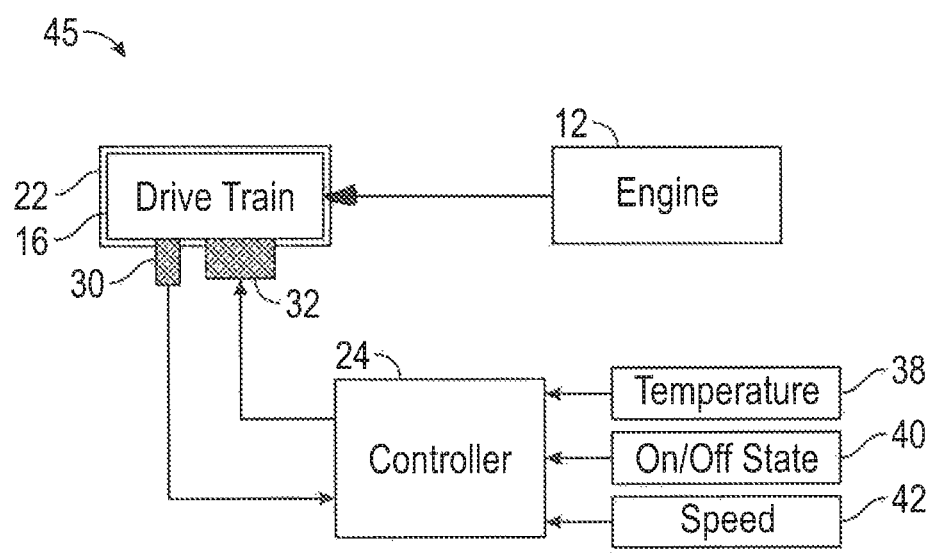
FIG. 5 is a schematic view of an example drivetrain component with actively controllable thermal conductivity.

Referring to FIG. 5, with continued reference to FIG. 1, in one disclosed example embodiment schematically indicated at 45, a drivetrain component 16 is at least partially encapsulated with the thermally active material 22. The example drivetrain component 16 may be a transmission and/or other component where temperature control provides beneficial operation. A temperature sensor 30 provides information on a temperature of the drivetrain 16 to the controller 24. An ambient temperature sensor 34 provides the controller 24 with additional temperature information. The controller 24 is configured to control the actuator 32 to modify the thermal conductivity to maintain the temperature of the drivetrain 16 within a predefined range. The actuator 32 may be a linear electric motor or a variable power source depending on the type of thermally active material utilized.

In this disclosed example, the thermally active material 22 is activated electrically and the actuator 32 is a variable electric power source. The controller 24 activates the actuator 32 to induce a change in the thermally active material 22 to reduce the flow of heat and thereby, enable the drivetrain 16 to warm up to a desired operating temperature quickly. Once the desired operating temperature is obtained the controller 24 turns the actuator 32 off to return the thermally active material 22 to the default thermally conductivity.

Figure 6:
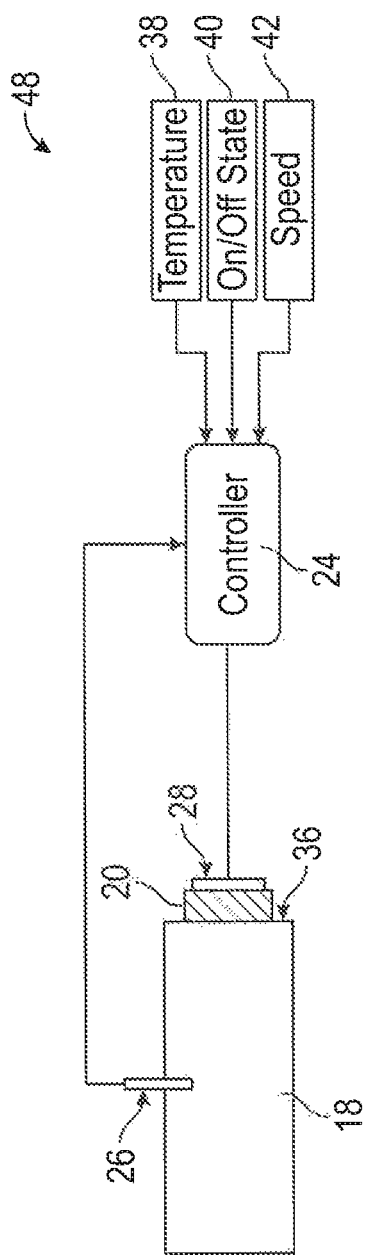
FIG. 6 is a schematic view of an example battery system with actively controllable thermal conductivity.

Referring to FIG. 6, with continued reference to FIG. 1, another example embodiment is a battery temperature control system 48 and includes the battery assembly 18. The battery assembly 18 is at least partially encapsulated with the thermally active material 20 disposed over a thermal transfer surface 36. A temperature sensor 26 communicates information indicative of battery temperature to the controller 24. The actuator 28 is coupled to the thermally active material 20. In this example, the thermally active material 20 is activated in response to an electric voltage and therefore the actuator 28 is a variable electric power source.

The example battery assembly 18 is shown with only part of one surface covered by the thermally active material 20. The remaining surfaces of the battery assembly 18 may be covered in an insulating material such that all heat transfer is conducted through the heat transfer surface 36. Alternatively, the remaining surfaces may be uncovered and conduct heat with control of heat transfer through the heat transfer surface 36 providing sufficient changes in thermal conductivity to provide desired variations. Moreover, all the surfaces may be covered with the thermally active material 20.

The controller 24 receives information for the temperature sensor 26 indicative of battery temperature and also receives information indicative of an ambient environment. In this example, vehicle speed 42, the operating state of the vehicle 40 and ambient temperature 38 are provided to the controller 24 for use in determining when and how to vary the thermal conductivity of the thermally active materials 20.

Figure 7:
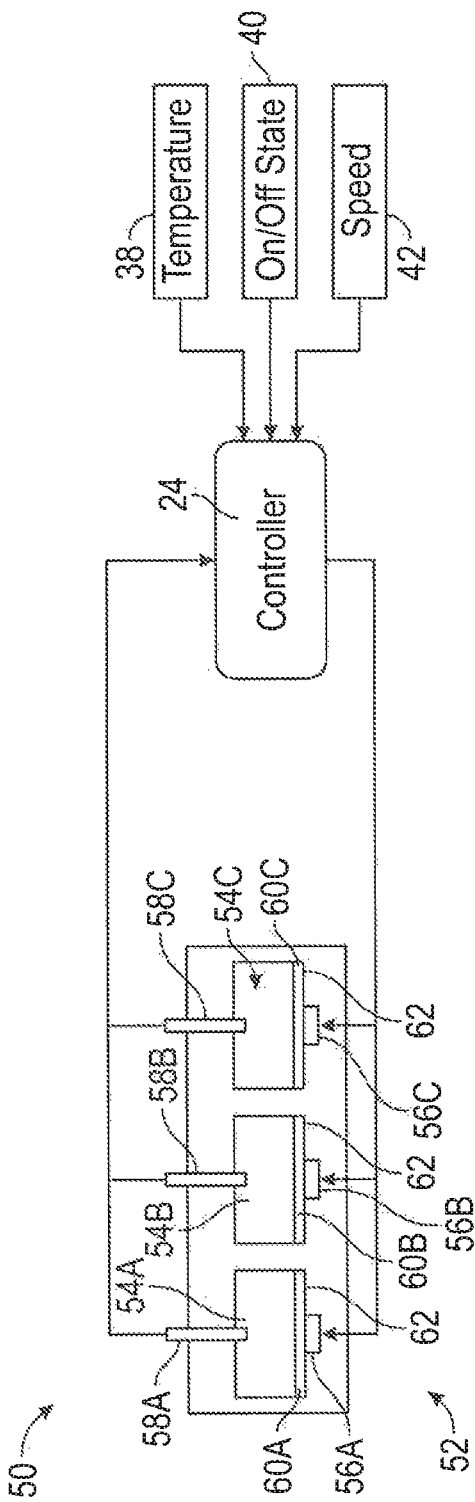
FIG. 7 is a schematic view of another example battery system with actively controllable thermal conductivity.

Referring to FIG. 7, another schematically shown battery temperature control system 50 includes a battery pack 52 with a plurality of individual arrays 54A-C. Each array 54A-C, containing a given number of individual cells, includes a separately controllable actuator 56A-C that activates a separate thermally active material 60A-C disposed over a thermal transfer surface 62. The separate thermally active materials 60A-C are individually controlled based on temperature information provided by a corresponding temperature sensor 58A-C. The controller 24 is therefore 24 enabled to separately control thermal conductivity in different parts of the battery array 52 based on localized conditions.

Powertrain components such as for example, the battery assembly 18 operate most efficiently within a predefined temperature range. If the temperature is too high, battery life and efficiency may be reduced. If the temperature is too low, battery performance may be impacted. Accordingly, the example systems 48, 50 are controlled move and maintain the temperature within a desired temperature range.

It is to be noted that different arrays in a battery pack heat up at different rates depending on their locations in the pack and do not necessarily reach the optimum battery temperature at the same time. The example system 50 enables deactivation for one of the arrays 54A-C when that array reaches the optimum operating temperature while keeping the other arrays activated. Gradually, all the arrays are deactivated as the whole battery pack 52 heats up. The same sequential scheme can be deployed during the battery cool off phase.

Figure 8:
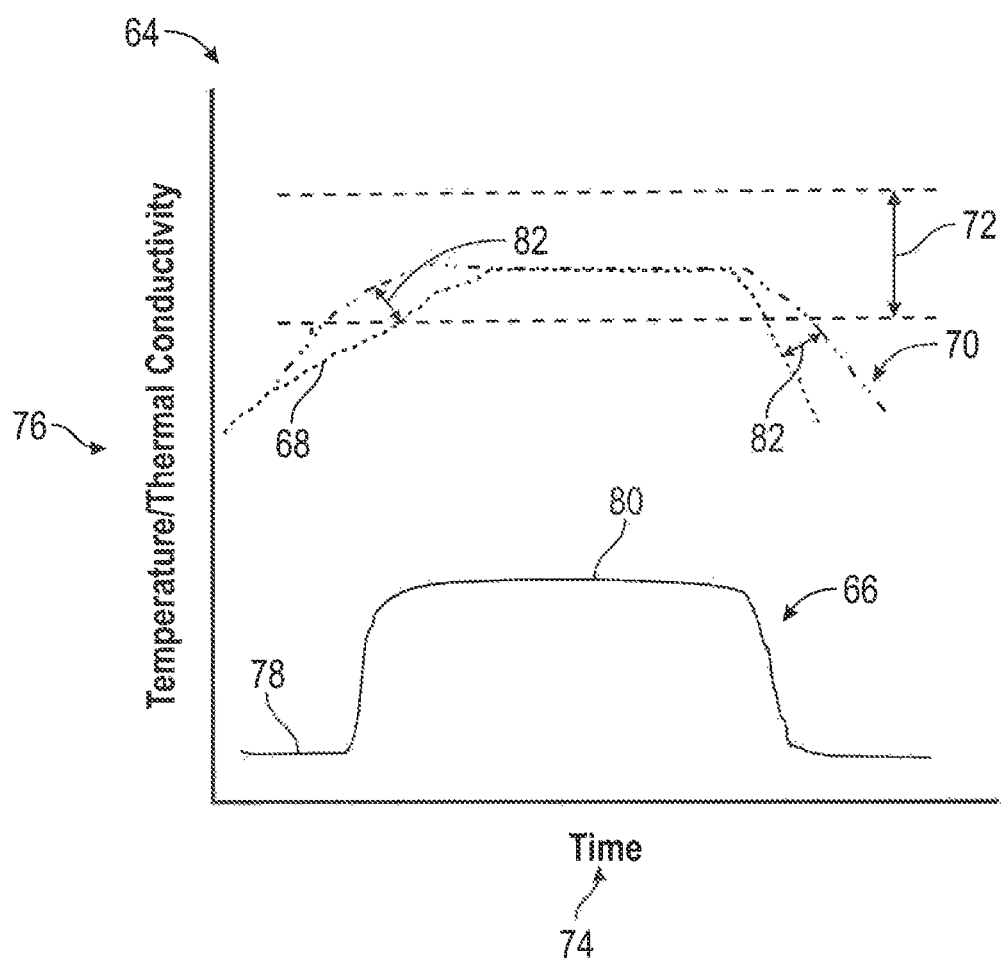
FIG. 8 is a graph illustrating differences in temperatures corresponding with active control of thermal conductivity.

Referring to FIG. 8, a graph 64 schematically illustrates the improved temperature response provided by controlling thermal conductivity. The example graph 64 includes a relationship between temperatures and thermal conductivity 76 over time 74. The thermal conductivity is shown as line 66. A desired operational temperature range is shown at 72.

In this example, thermal conductivity 66 begins at an activated state that provides a high resistance to heat flow as indicated at 78. The increased resistance to heat flow results in a sharper rise in temperature as shown by the difference between line 68 that is indicative of a temperature rise without the change in thermal conductivity and the line 70 that is indicative of the temperature rise with a reduced thermal conductivity. After ensuring the temperature increase rate is satisfactory, a the thermal material is deactivated and the thermal conductivity moves to second value 80 having increased thermal conductivity and provides less resistance to heat flow or better cooling. When the powertrain is in 'off' state (not operational), the material is activated again to decrease thermal conductivity so heat is retained within the component as shown by line 70. The difference shown at 82 moves the temperature into the desired temperature range 72 for a longer period of time to provide extended period of efficient battery operation. Note that 72 is the desired operating range of temperature for the component and longer the component stays in this temperature range, more efficient is its performance.

Figure 9:
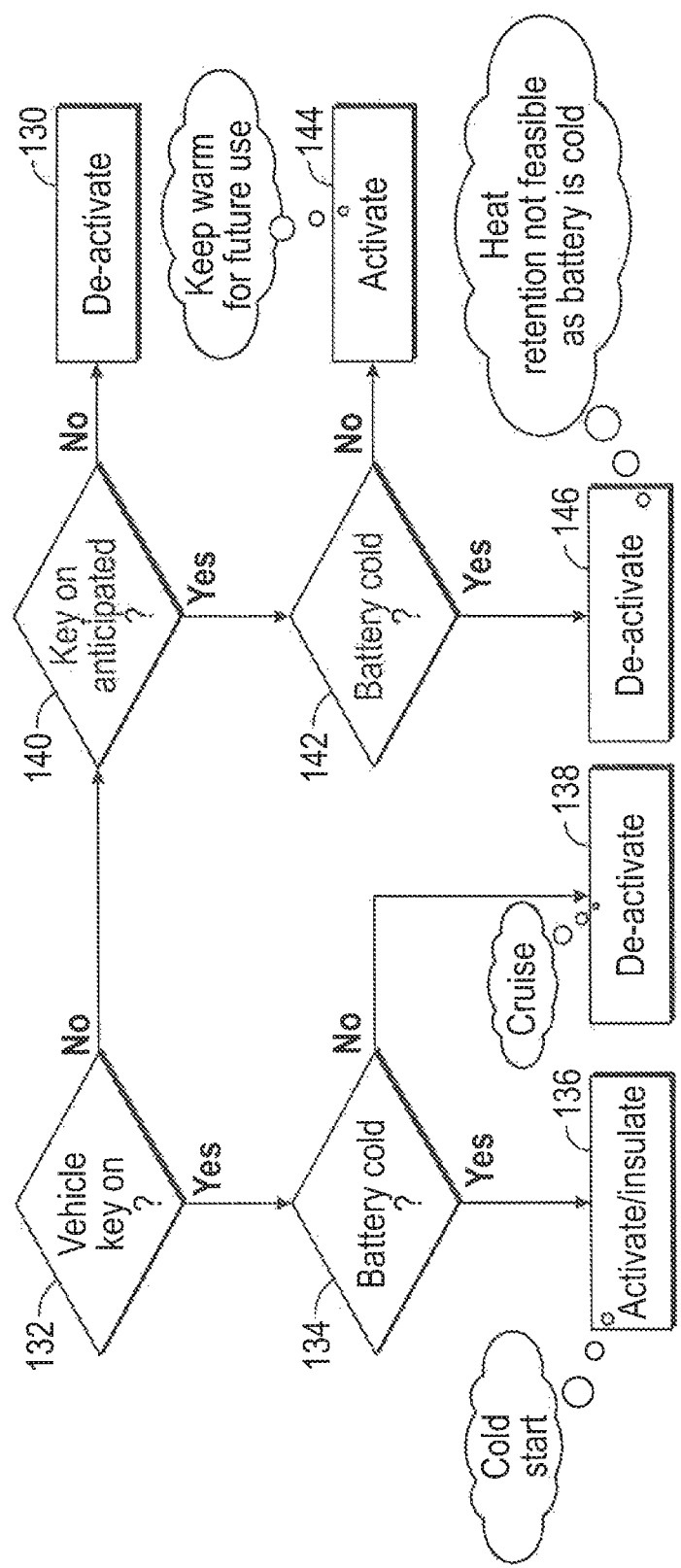
FIG. 9 is a flow diagram illustrating example operation of an active thermal control of an example battery system.

Referring to FIG. 9, with reference to FIG. 1, a flowchart 130 illustrates an example operation of the thermally active materials 20, 22 based on a sensed vehicle operating conditions. A first step 132 begins operation by verifying that the vehicle ignition is on. If the vehicle ignition is one, the controller 24 determines if the battery assembly 18 is cold with information provided by the temperature sensor 26 as indicated at 134. If the battery is cold, meaning below the desired temperature, the controller 24 activates the actuator 28 to change the thermal conductivity from a first default value to second value as is indicated at 136. In this example, the first value provides the highest thermal conductivity to provide cooling and the second value provides a lowest thermal conductivity to retain the most heat.

If the battery assembly 18 is within a predefined temperature range, the controller 24 will either not activate the actuator 28, or turn the actuator off to return the thermally active material back to the default high conductivity state to facilitate cooling as is indicated at 138.

If the vehicle ignition is not turned on, the controller 24 may determine if actuation of the ignition is anticipated as is indicated at 140. Anticipation of an imminent vehicle ignition may be inferred from various states of the vehicle such as the vehicle being unlocked, parking lamps turned on along with various other actions that are precursors to vehicle operation.

The controller 24 uses these states to infer that the vehicle has a high probability of being started within a short time. If the controller 24 determines that vehicle ignition is not imminent, then nothing is done and the system remains in a default condition. If the controller 24 determines that vehicle ignition is imminent and that the battery assembly 18 is below a desired temperature as indicated at 142, the controller 24 would leave the actuator in the default condition as indicated at 146 because until the vehicle is actually started, the cold battery assembly would not generate sufficient heat to provide heating. Accordingly, the actuator is either not activated or de-activated as is indicated at 144. However, if the battery assembly 18 is within the defined temperature limits, then the controller 24 would activate the actuator 28 as indicated at 144 to maintain the temperature of the battery for the imminent vehicle operation.

Whether a battery is cold or warm could be decided from the difference of battery temperature and the optimum battery temperature for maximum efficiency and/or compared against a preset value stored in the controller 24.

Figure 10:
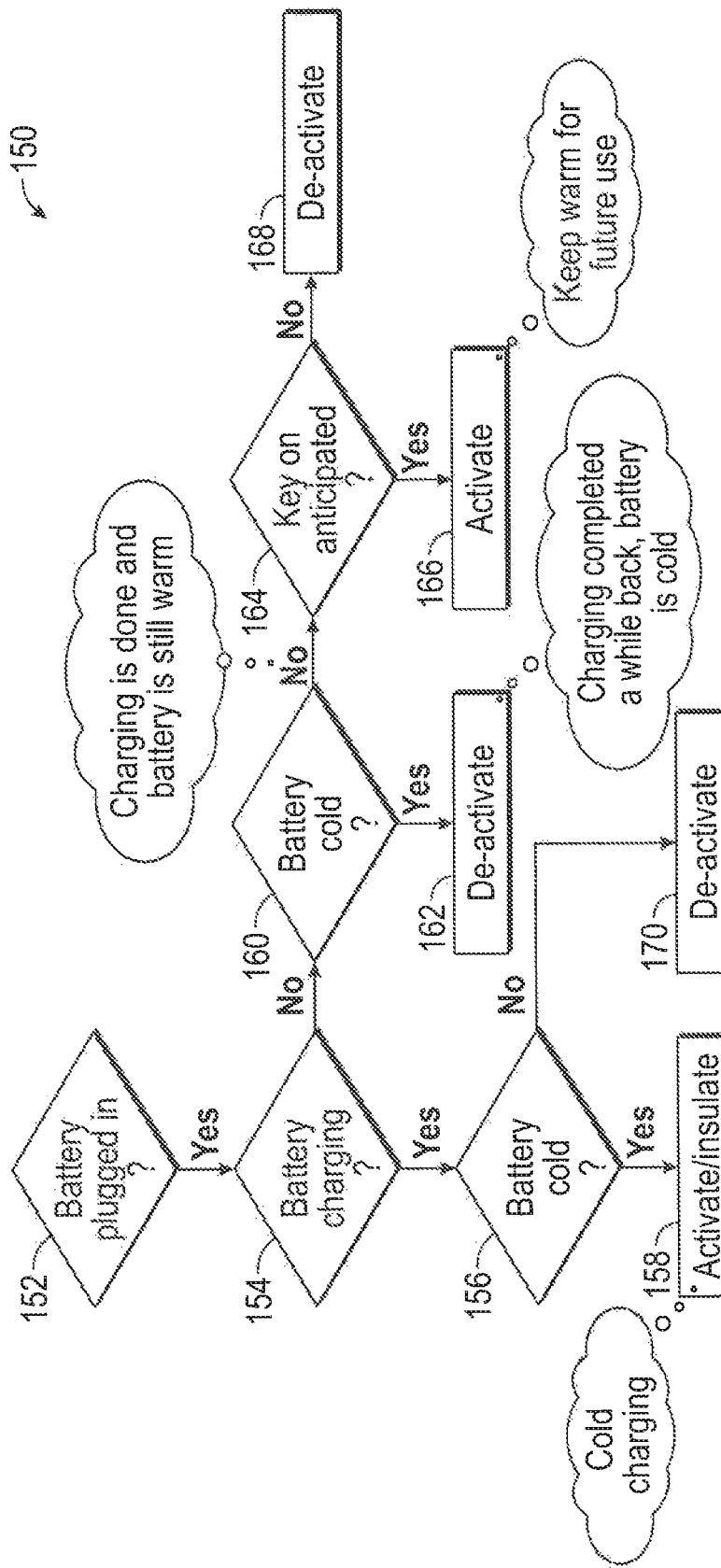
FIG. 10 is a flow diagram illustrating another example operation of an active thermal control of an example battery system.

Referring to FIG. 10, with reference to FIG. 1, operation of the example powertrain assembly 15 during a battery charging operation is illustrated by flow chart 150. The battery assembly 18 is charged by way of charger 44 being electrically coupled to a charging port 46 (FIG. 1). The example charger 44 may be a DC fast charging device and the controller 44 may change the thermally active material to maximize charging efficiency and reduce electricity wastage.

The internal resistance in a battery is high at both low and high temperatures and is low for moderate temperature range. The controller 24 will determine if the battery assembly 18 is coupled to a charger as indicated at 152 and further determine if the battery is being charged as indicated at 154. When charging is initiated while the battery is cold as indicated at 156, insulating the battery is beneficial as it will heat up faster and go into higher efficiency state (lower internal resistance) sooner so less electricity is wasted as heat as charging continues. Accordingly, the actuator is activated to change the thermal conductivity to insulate the battery as indicated at 158.

When the battery has reached a certain elevated temperature, allowing the battery to reject the heat generated is necessary so the battery temperature does not exceed the operating temperature limit. Accordingly, once the battery assembly 18 is no longer cold, the controller 24 will de-activate the actuator 28 and allow the thermal conductivity to return to the default condition with higher thermal conductivity. Higher thermal conductivity is beneficial when the battery assembly 18 is within the temperature range and still charging as indicated by 170.

It may be noted that a battery may be at a sufficiently high temperature at the start of charging (after a long drive) and such activation of tunable thermal conductivity is not necessary as indicated by 170 once again.

After charging is completed, the battery is typically at a high temperature and depending on anticipated key on condition, indicated at 164, the thermal conductivity may be activated or deactivated as indicated at 168. However, if the vehicle is anticipated to start soon, the controller 24 may actuate the thermally active material 20 to reduce thermal conductivity and keep the battery assembly 18 warm as indicate at 166. When charging has been done and the battery is cold (short charge, charging completed a long time ago), thermal conductivity is kept in a deactivated state as indicated at 162.

Although, on/off states or activate/deactivate states are mentioned for the thermally active materials, it is also within the contemplation of this disclosure to gradually alter the thermal conductivity so that the transition is not abrupt. Moreover, there is some energy consumption while the material is in activated state and this increase in energy is justified by the benefit derived from such activation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle powertrain component comprising:
   a thermal transfer surface that transfers thermal energy out of a powertrain component;
   a thermally active material disposed over the thermal transfer surface, the thermally active material including a variable thermal conductivity;
   an actuator coupled to the thermally active material for inducing changes in the thermal conductivity of the thermally active material;
   a controller governing operation of the actuator to adjust the thermal conductivity of the thermally active material responsive to a vehicle operating condition to maintain the powertrain component within a predefined temperature range.

2. The vehicle powertrain component as recited in claim 1, wherein the vehicle operating condition comprises a temperature detected by a temperature sensor mounted to the powertrain component.

3. The vehicle powertrain component as recited in claim 1, wherein the vehicle operation condition comprises a duration of vehicle operation.

4. The vehicle powertrain component as recited in claim 1, wherein the actuator comprises an electric power source electrically coupled to the thermally active material for inducing a charge that alters the thermal conductivity of the thermally active material.

5. The vehicle powertrain component as recited in claim 1, wherein the actuator comprises a mechanical actuator coupled to the thermally active material for inducing a strain load on the thermal active material to alter the thermal conductivity of the thermally active material.

6. The vehicle powertrain component as recited in claim 1, wherein the powertrain component comprises a battery pack.

7. The vehicle powertrain component as recited in claim 6, wherein the controller is configured to receive information indicative of an ambient environment surrounding the battery pack and operate the actuator to adjust a thermal conductivity of the thermally active material to provide a predefined rate of thermal transfer from the battery pack.

8. The vehicle powertrain component as recited in claim 1, wherein the thermally active material includes a first thermal conductivity at a first vehicle operating condition and a second thermal conductivity at a second vehicle operating condition.

9. The vehicle powertrain component as recited in claim 1, wherein the thermally active material varies between a plurality of thermal conductivities between a first thermal conductivity and a second thermal conductivity.

10. The vehicle powertrain component as recited in claim 9, wherein the first thermal conductivity is higher than the second thermal conductivity.

11. The vehicle powertrain component as recited in claim 10, wherein the thermally active material is at the first thermal conductivity at an activated state and the second thermal conductivity at a default condition in the absence of an input from the actuator.

12. A vehicle battery pack assembly comprising:
a battery pack including thermal transfer surface through which thermal energy is directed out of the battery pack;
a thermally active material disposed over the thermal transfer surface, the thermally active material including a thermal conductivity that varies through a plurality of thermal conductivities between a first thermal conductivity and a second thermal conductivity;
an actuator coupled to the thermally active material for inducing changes in the thermal conductivity; and
a controller governing operation of the actuator to adjust the thermal conductivity of the thermally active material responsive to a vehicle operating condition to provide a predefined rate of thermal transfer from the battery pack.

13. The vehicle battery pack assembly as recited in claim 12, including a temperature sensor generating a signal indicative of a temperature of the battery pack and the controller operates the actuator to vary the thermal conductivity of the thermally active material.

14. The vehicle battery pack assembly as recited in claim 12, wherein the vehicle operating condition comprises a duration of vehicle operation.

15. The vehicle battery pack assembly as recited in claim 12, wherein the actuator comprises an electric power source electrically coupled to the thermally active material for inducing a charge that alters the thermal conductivity of the thermally active material.

16. The vehicle battery pack assembly as recited in claim 12, wherein the actuator comprises a mechanical actuator coupled to the thermally active material for inducing a load on the thermal active material to alter the thermal conductivity of the thermally active material.

17. The vehicle battery pack assembly as recited in claim 12, wherein the first thermal conductivity is higher than the second thermal conductivity.

18. The vehicle battery pack assembly as recited in claim 12, wherein the thermally active material is at the first thermal conductivity at an activated state and the second thermal conductivity at a default condition in the absence of an input from the actuator.

19. A method of controlling a temperature of a battery pack comprising:
providing a thermally active material over a thermal transfer surface of a battery pack;
measuring an operating parameter of the battery pack with a sensor;
operating an actuator coupled to the thermally active material to induce a change in thermal conductivity in the thermally active material responsive to the measured operating parameter.

20. The method as recited in claim 19, wherein operating an actuator coupled to the thermally active material to induce a change in thermal conductivity in the thermally active material responsive to the measured operating parameter.

21. The method as recited in claim 20, wherein the thermal conductivity of the thermally active material varies through a plurality of thermal conductivity values between a first thermal conductivity and a second thermal conductivity.

22. The method as recited in claim 21, wherein the first thermal conductivity is higher than the second thermal conductivity.

23. The method as recited in claim 22 wherein the first thermal conductivity is at an activated state and the second thermal conductivity is default thermal conductivity for the thermally active material in the absence of an input from the actuator.

24. The method as recited in claim 21, wherein the actuator comprises a variable electric power source and the thermal conductivity of the thermally active material varies in response to an induced electrical current.

25. The method as recited in claim 21, wherein the actuator comprises a linear electric motor and the thermal conductivity of the thermally active material varies in response to a load induced by the linear electric motor.

* * * * *